US010566109B2

(12) United States Patent
Muto et al.

(10) Patent No.: US 10,566,109 B2
(45) Date of Patent: Feb. 18, 2020

(54) INSULATED WIRE, COIL AND ELECTRICAL OR ELECTRONIC EQUIPMENT

(71) Applicants: FURUKAWA ELECTRIC CO., LTD., Tokyo (JP); FURUKAWA MAGNET WIRE CO., LTD., Tokyo (JP)

(72) Inventors: Daisuke Muto, Tokyo (JP); Makoto Oya, Tokyo (JP); Keiichi Tomizawa, Tokyo (JP); Hideo Fukuda, Tokyo (JP); Tsuneo Aoi, Tokyo (JP)

(73) Assignees: FURUKAWA ELECTRIC CO., LTD., Tokyo (JP); FURUKAWA MAGNET WIRE CO., LTD., Tokyo (JP)

(*) Notice: Subject to any disclaimer, the term of this patent is extended or adjusted under 35 U.S.C. 154(b) by 0 days.

(21) Appl. No.: 16/132,872

(22) Filed: Sep. 17, 2018

(65) Prior Publication Data

US 2019/0027271 A1 Jan. 24, 2019

Related U.S. Application Data

(63) Continuation of application No. PCT/JP2017/007713, filed on Feb. 28, 2017.

(30) Foreign Application Priority Data

Apr. 6, 2016 (JP) ................... 2016-076903

(51) Int. Cl.
*H01B 7/00* (2006.01)
*H01B 7/02* (2006.01)
(Continued)

(52) U.S. Cl.
CPC ........... *H01B 7/0208* (2013.01); *H01B 3/307* (2013.01); *H01B 3/427* (2013.01); *H01B 13/065* (2013.01);
(Continued)

(58) Field of Classification Search
CPC ................. H01B 7/0208; H01B 7/08
(Continued)

(56) References Cited

U.S. PATENT DOCUMENTS 8,193,451 B2 * 6/2012 Kikuchi ............ C08G 18/3237
174/110 R
2012/0048592 A1 3/2012 Kikuchi et al.
(Continued)

FOREIGN PATENT DOCUMENTS

CN 102385948 A 3/2012
CN 103177807 A 6/2013
(Continued)

OTHER PUBLICATIONS

International Search Report (PCT/ISA/210) issued in PCT/JP2017/007713, dated Apr. 11, 2017.
(Continued)

*Primary Examiner* — Chau N Nguyen
(74) *Attorney, Agent, or Firm* — Birch, Stewart, Kolasch & Birch, LLP

(57) ABSTRACT

An insulated wire, containing:
  a conductor having a rectangular cross-section; and
  an insulating coated film having at least two insulating layers laminated together on the conductor,
wherein the laminated insulating coated film is composed of:
  an enamel insulating layer formed from a thermosetting resin on the outer periphery of the conductor, and
  an extruded insulating layer formed from a thermoplastic resin on the outer side of the enamel insulating layer,
wherein the thickness of the enamel insulating layer is 50 μm or more, and wherein the total thickness (T) and the relative permittivity (ε) at 100° C. of the laminated insulating coated film; and the maximum thickness (Tmax), and the maximum value (εmax) and the minimum value (εmin) of the relative (Continued)

permittivity at 100° C. of one layer among the laminated insulating layers; satisfy all of the following relations:

$$T \geq 100 \ \mu m \quad (1.1)$$

$$T\text{max} \leq 100 \ \mu m \quad (1.2)$$

$$1.5 \leq \varepsilon \leq 3.5 \quad (2.1)$$

$$1.0 \leq \varepsilon\text{max}/\varepsilon\text{min} \leq 1.2 \quad (2.2)$$

a coil; and
an electrical or electronic equipment.

8 Claims, 2 Drawing Sheets

(51) Int. Cl.
| | | |
|---|---|---|
| *H01F 5/06* | (2006.01) | |
| *H02K 3/30* | (2006.01) | |
| *H01B 3/30* | (2006.01) | |
| *H01B 3/42* | (2006.01) | |
| *H01B 13/06* | (2006.01) | |
| *H01B 13/14* | (2006.01) | |
| *H01F 27/28* | (2006.01) | |

(52) U.S. Cl.
CPC ............ *H01B 13/146* (2013.01); *H01F 5/06* (2013.01); *H01F 27/2823* (2013.01); *H02K 3/30* (2013.01)

(58) Field of Classification Search
USPC ........................... 174/120 R, 120 SR, 117 FF
See application file for complete search history.

(56) References Cited

U.S. PATENT DOCUMENTS

| | | |
|---|---|---|
| 2013/0161065 A1 | 6/2013 | Honda et al. |
| 2015/0021067 A1 | 1/2015 | Muto et al. |
| 2015/0027748 A1 | 1/2015 | Fukuda et al. |
| 2016/0307668 A1 | 10/2016 | Oya et al. |

FOREIGN PATENT DOCUMENTS

| | | | |
|---|---|---|---|
| CN | 104170025 A | | 11/2014 |
| EP | 2843668 A1 | | 3/2015 |
| JP | 2014-154262 A | | 8/2014 |
| WO | WO 2014/122828 | * | 8/2014 |
| WO | WO 2015/098637 A1 | | 7/2015 |

OTHER PUBLICATIONS

Muto et al., "A Study on Partial Discharge Phenomena of Winding Wires", Furukawa Review, vol. 133, 2014, pp. 11-18.
Office Action issued in Japanese Patent Application No. 2016-076903, dated Jul. 24, 2018.
Office Action issued in Japanese Patent Application No. 2016-076903, dated May 15, 2018.
Written Opinion (PCT/ISA/237) issued in PCT/JP2017/007713, dated Apr. 11, 2017.
Chinese Office Action and Search Report for corresponding Chinese Application No. 201780016933.1, dated Sep. 29, 2019, with English transation.
Extended European Search Report for corresponding European Application No. 17778895.7, dated Oct. 31, 2019.

* cited by examiner

INSULATED WIRE, COIL AND ELECTRICAL OR ELECTRONIC EQUIPMENT

CROSS-REFERENCE TO RELATED APPLICATIONS

This application is a Continuation of PCT International Application No. PCT/JP2017/007713 filed on Feb. 28, 2017, which claims priority under 35 U.S.C. § 119 (a) to Japanese Patent Application No. 2016-076903 filed in Japan on Apr. 6, 2016. Each of the above applications is hereby expressly incorporated by reference, in its entirety, into the present application.

TECHNICAL FIELD

The present invention relates to an insulated wire, a coil, and an electrical or electronic equipment.

BACKGROUND OF THE INVENTION

In coils for electrical or electronic equipment including inverter-related equipment such as high-speed switching devices, inverter motors, transformers, and the like, there are used insulated electric wires (insulated wires) composed of a so-called enamel wire, insulated wires having multi-covering layers including a layer composed of an enamel resin and a covering layer composed of another kind of thermoplastic resin other than the enamel resin, and the like as a magnet wire.

On the other hand, in recent years, advance of the electrical equipment represented by motors or transformers, has been progressed resulting in size reduction and improved performance. Thus, it becomes usual in many cases that insulated wires are used in such a way that the insulated wires are processed by winding (coil processing) and they are pushed into a quite small space to pack. Specifically, for an enhancement of the performance of a rotating machine such as a motor, it is required that a larger number of wound wires are accommodated into the slots of a stator. That is, improvement of the ratio of the sectional area of conductors to the sectional area of the stator slot (space factor) has been required to be particularly highly increased.

It has been lately attempted to use a rectangular wire in which the conductor has a shape similar to a rectangular (square or rectangle), as a means for increasing the space factor.

Use of a rectangular wire exhibits a dramatic effect in increasing the space factor. However, a corner portion of cross-section rectangular is extremely brittle to bending processing such as coil processing. Due to this, there is a problem that a coated film cracks when the rectangular wire is processed by applying strong pressure. In particular, it is known that the crack of the coated film tends to occur more easily as the curvature radius of the corner portion is smaller.

Furthermore, when the distance between conductors cannot be secured by making the thickness of the insulating coated film of the wound wire smaller, and the insulation performance cannot be secured. Furthermore, when the insulating coated film of the wound wire is damaged, discharge occurs from the exposed conductor of the wound wire.

In order to improve these electrical characteristics and mechanical characteristics, various investigations have been conducted.

For example, from a relation involving the relative permittivities of the enamel insulating layer and an extruded insulating layer and the temperature dependency of the tensile strength of the extruded insulating layer, it has been suggested that the thickness of the insulating coated film is made thick without impairing the insulation performance at high temperature, thereby the partial discharge inception voltage is increased, and the thermal-aging characteristics are improved (see Patent Literature 1).

CITATION LIST

Patent Literature

Patent Literature 1: JP-A-2014-154262 ("JP-A" means unexamined published Japanese patent application)

DISCLOSURE OF INVENTION

Technical Problem

It has become demanded to enhance reliability by further improving various performances, such as heat resistance, mechanical properties, chemical property, and electrical property, in the electronic or electrical equipment (hereinafter, which may be simply referred to as electrical equipment) developed in recent years, as compared to the conventional electrical equipment.

In conventional insulated wires, in order to increase the thickness of the enamel insulating layer, it is necessary to repeat the application and baking of a thermosetting resin varnish several times. Therefore, it is general to increase the thickness of the extruded insulating layer formed from a thermoplastic resin, since a thick insulating coated film can be formed by extrusion at one time.

In regard to an insulating coated film having the same thickness, the inventors of the present invention made the extruded insulating layer thin and the enamel insulating layer thick, in a way opposite to the conventional cases. However, the dielectric strength (dielectric breakdown voltage) was not sufficient due to the difference in the relative permittivity in the insulating coated film. Furthermore, when the thickness of a single layer of insulating layer was more than 100 μm, or the value of the ratio between the maximum value and the minimum value of the relative permittivity in the insulating coated film was more than 1.2, the dielectric strength (dielectric breakdown voltage) was deteriorated.

Therefore, it is an object of the present invention to provide an insulated wire, a coil and an electrical or electronic equipment having high dielectric strength (dielectric breakdown voltage) and a high partial discharge inception voltage even in case of having a thick enamel insulating layer, and having excellent mechanical characteristics such as heat resistance and notched edgewise bending.

Solution to Problem

The inventors of the present invention found that unlike conventional cases, when the enamel insulating layer is made thicker than the extruded insulating layer, heat resistance is enhanced, and the insulation property against external damage is enhanced. For this reason, the inventors conducted a thorough investigation based on the results of the investigation described above. As a result, the inventors found that particular relations between the thickness of a laminated insulating coated film, the maximum film thickness of the insulating layers that constitute the insulating coated film, the relative permittivity of the insulating coated film, and the relative permittivities of the insulating layers that constitute the insulating coated film are important. The present invention was completed on the basis of the above findings.

In other words, the above-described problems of the present invention are solved by the following means.

(1) An insulated wire, containing:
a conductor having a rectangular cross-section; and
an insulating coated film having at least two insulating layers laminated together on the conductor,
wherein the laminated insulating coated film is composed of:
an enamel insulating layer formed from a thermosetting resin on the outer periphery of the conductor, and
an extruded insulating layer formed from a thermoplastic resin on the outer side of the enamel insulating layer,
wherein the thickness of the enamel insulating layer is 50 μm or more, and wherein the total thickness (T) and the relative permittivity (ε) at 100° C. of the laminated insulating coated film; and the maximum thickness (Tmax), and the maximum value (εmax) and the minimum value (εmin) of the relative permittivity at 100° C. of one layer among the laminated insulating layers; satisfy all of the following relations:

$$T \geq 100 \text{ μm} \quad (1.1)$$

$$T\text{max} \leq 100 \text{ μm} \quad (1.2)$$

$$1.5 \leq \varepsilon \leq 3.5 \quad (2.1)$$

$$1.0 \leq \varepsilon\text{max}/\varepsilon\text{min} \leq 1.2 \quad (2.2)$$

(2) The insulated wire described in the above item (1), wherein the thermosetting resin is at least one kind of thermosetting resin selected from the group consisting of a polyamideimide resin, a polyimide resin and a polyetherimide resin.
(3) The insulated wire described in the above item (1) or (2), wherein the thermoplastic resin is at least one kind of thermoplastic resin selected from the group consisting of polyether ether ketone, a thermoplastic polyimide and polyphenylene sulfide.
(4) The insulated wire described in any one of the above items (1) to (3), wherein the number of laminated layers of the laminated insulating coated film is 4 or less.
(5) A coil, containing the insulated wire described in any one of the above items (1) to (4).
(6) An electrical or electronic equipment, containing the coil described in the above item (5).
(7) The electrical or electronic equipment described in the above item (6), wherein the electrical or electronic equipment is a generator or an electric motor.

In the present invention, unless particularly stated otherwise, the thickness of any of the insulating coated film and various insulating layers is the thickness of a flat portion in a rectangular cross-section, and in a case in which the thicknesses of the short side and the long side are different, the thickness is the average thickness.

Furthermore, an insulating layer is a layer formed from an insulating material, and in the present invention, the insulating layer is a layer formed from a resin selected from a thermosetting resin and a thermoplastic resin. A lubricating oil applied on the surface, and the like are not included in the insulating layer.

The thickness of one layer of the insulating layer is not limited; however, the thickness is practically 2 μm or more. Meanwhile, an enamel insulating layer means a group of insulating layers formed from a thermosetting resin, and an extruded insulating layer means a group of insulating layers formed from a thermoplastic resin.

Effects of Invention

According to the present invention, it is possible to provide an insulated wire, a coil and an electrical or electronic equipment having high dielectric strength (dielectric breakdown voltage) and a high partial discharge inception voltage even in case of having a thick enamel insulating layer, and having excellent mechanical characteristics such as heat resistance and notched edgewise bending.

Other and further features and advantages of the invention will appear more fully from the following description, appropriately referring to the accompanying drawings.

MODE FOR CARRYING OUT THE INVENTION

<<Insulated Wire>>

The insulated wire (also referred to as insulated wire) of the present invention has an insulating coated film formed on a conductor having a rectangular cross-section, the insulating coated film having at least two layers of insulating layers laminated together. The laminated insulating coated film is composed of an enamel insulating layer formed from a thermosetting resin on the outer periphery of the conductor, and an extruded insulating layer formed from a thermoplastic resin on the outer side of the enamel insulating layer.

Here, in the present invention, the thickness of the enamel insulating layer in particular is 50 μm or more.

The thickness of the enamel insulating layer described above is the total thickness of all the enamel insulating layers existing between the conductor and the extruded insulating layers.

The enamel insulating layer is formed to have a particular thickness by repeatedly performing application and baking of a thermosetting resin varnish. In the present invention, in a case in which a thermosetting resin varnish having a completely identical composition is repeatedly used in order to simply increase the thickness, the whole layer is counted as one layer.

Figure 1:
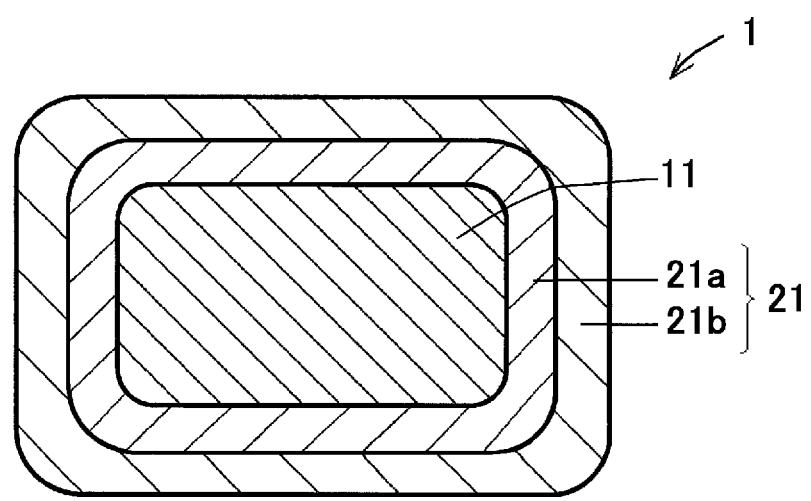
FIG. 1 is a schematic cross-sectional view showing a preferred embodiment of the insulated wire of the present invention.

FIG. 1 illustrates a preferred outline cross-sectional shape of the insulated wire 1 of the present invention.

An enamel insulating layer 21a and an extruded insulating layer 21b are provided in this order on a conductor 11, and the insulating coated film 21 includes at least the enamel insulating layer 21a and the extruded insulating layer 21b.

Here, an embodiment in which the enamel insulating layer 21a and the extruded insulating layer 21b respectively have a plurality of layers laminated together, is also included in the present invention. However, this is not shown in FIG. 1.

In the present invention, the insulating coated film 21 may also include a layer other than the enamel insulating layer 21a and the extruded insulating layer 21b. However, similarly, this is not shown in FIG. 1.

Furthermore, the thicknesses of the enamel insulating layer 21a and the extruded insulating layer 21b are simply illustrated schematically and are not intended to respectively represent relatively accurate thicknesses.

In the present invention, the cross-section as used to refer a rectangular cross-section or the like is a cross-section that orthogonally intersects the longitudinal direction of the insulated wire. An insulating coated film means that the coated film continuously covers the conductor in the longitudinal direction so as to have the cross-sectional shape shown in FIG. 1.

<Conductor>

As the conductor used in the present invention, use may be made of any conductor that is usually used in insulated wires and examples thereof include a metal conductor such as a copper wire and an aluminum wire. The conductor used in the present invention is preferably a copper conductor, and the copper to be used is preferably a low-oxygen copper whose oxygen content is 30 ppm or less, and furthermore preferably a low-oxygen copper whose oxygen content is 20 ppm or less or oxygen-free copper. In a case where the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

Further, in a case where the conductor is aluminum, based on a consideration of a required mechanical strength, various aluminum alloys may be used depending on the intended use. For example, for such a use as a rotating electrical machine, it is preferred to use a 99.00% or more-grade pure aluminum by which a high current value can be obtained.

In the present invention, a conductor having a rectangular (straight-angled) cross-sectional shape is used. Thereby, the space factor of the conductor in the slot of a stator can be increased.

A size of the conductor is determined according to the application, and is not particularly designated. In the case of a rectangular conductor, a width (long side) as a length of one side is preferably 1.0 to 5.0 mm, and more preferably 1.4 to 4.0 mm, and a thickness (short side) is preferably 0.4 to 3.0 mm, and more preferably 0.5 to 2.5 mm. However, a range of the conductor size in which effects of the present invention are obtained is not limited thereto. Moreover, in the case of the rectangular conductor, although the shape is also different according to the application, a cross-sectional rectangular (quadrate) is more general than a cross-sectional square. Moreover, in the case of the rectangular conductor, when the application is the rotating electrical machine, for chamfering (curvature radius r) in four corners in a conductor cross section, r is preferably smaller from a viewpoint of keeping the high conductor occupancy in the slot of the stator core. From a viewpoint of suppressing a phenomenon of partial discharge by concentration of an electric field on the four corners, r is preferably larger. Thus, the curvature radius r is preferably 0.6 mm or less, and more preferably 0.2 to 0.4 mm. However, the range in which the effects of the present invention are obtained is not limited thereto.

It is also acceptable that a rectangular conductor is formed by stranding or combining a plurality of conductors.

<Enamel Insulating Layer>

The enamel insulating layer is formed from a thermosetting resin. According to the present invention, it is particularly preferable that the insulated wire has an enamel insulating layer and an extruded insulating layer in this order from the conductor, and that the enamel insulating layer in particular is provided on the outer periphery of the conductor so as to be in direct contact with the conductor.

However, according to necessity or the purpose, it is also acceptable that a thermoplastic resin layer formed from a thermoplastic resin, for example, an amorphous thermoplastic resin, is provided between the conductor and the enamel insulating layer.

Meanwhile, when such a thermoplastic resin layer is provided to be in contact with the conductor, the adhesiveness between the insulating coated film and the conductor is increased.

Here, the enamel insulating layer provided on the outer periphery of the conductor so as to be in direct contact with the conductor may be simply referred to as enamel (resin) layer.

(Thermosetting Resin)

In the present invention, any thermosetting resin may be used as long as it is a thermosetting resin that is used in insulated wires.

Specific examples thereof include: polyamideimide (PAI), polyimide (PI), polyetherimide (PEI), polyesterimide (PEsI), polyurethane (PU), polyester (PEst), a polybenzimidazole, a melamine resin, and an epoxy resin.

Among these, polyamideimide (PAI), polyimide (PI), polyetherimide (PEI), polyesterimide (PEsI), polyurethane (PU), and polyester (PEst) are preferred; and a thermosetting resin having an imide bond is more preferred.

Among these, examples of the thermosetting resin having an imide bond include polyamideimide (PAI), polyimide (PI), polyetherimide (PEI), and polyesterimide (PEsI).

In the present invention, the resin selected from the polyamideimide (PAI), the polyimide (PI) and the polyetherimide (PEI) is preferable.

The polyamide (PAI), when compared to the other resins, has a lower thermal conductivity and a higher dielectric breakdown voltage, and a bake-setting can be conducted. The polyamideimide is not particularly limited. Examples thereof include: polyamideimides obtained by a usual method, for example, a method in which a tricarboxylic anhydride and a diisocyanate compound are directly reacted in a polar solvent, or a method in which a diamine compound is reacted with a tricarboxylic anhydride in a polar solvent, to previously introduce an imide bond to the reaction product, and then the reaction product is subjected to amidation using a diisocyanate compound.

Examples of the polyamideimide (PAI) include: trade name: HPC-9000, manufactured by Hitachi Chemical Co., Ltd., trade name: HI 406, manufactured by Hitachi Chemical Co., Ltd., and the like.

The polyimide (PI) is not particularly limited, but use may be made of: any of usual polyimide resins, such as a whole aromatic polyimide and a thermosetting aromatic polyimide. Alternatively, use may be made of polyimides obtained by a usual method in which an aromatic tetracarboxylic dianhydride and an aromatic diamine compound are reacted in a polar solvent to obtain a polyamide acid solution, and then the obtained polyamide acid solution is subjected to imidization by a thermal treatment at the time of baking.

Examples of the polyimide (PI) include: trade name, U-IMIDE, manufactured by Unitika Ltd.; trade name, U-VARNISH-A, manufactured by Ube Industries, Ltd.; and trade name, #3000, manufactured by DU PONT-TORAY CO., LTD.

The polyetherimide (PEI) is permissible, as long as it is a thermosetting resin having an ether bond and an imide bond in the molecule. For example, it is also possible to use a product obtained by using a polyamidic acid solution obtained by reacting, in a polar solvent, an aromatic tetracarboxylic acid dianhydride and an aromatic diamine having an ether bond in the molecule, and by subjecting the polyamidic acid solution to imidization due to a heating treatment for baking in the covering step.

Examples of the polyetherimide (PEI) include: trade name, ULTEM1000, manufactured by SABIC, and the like.

The polyesterimide (PEsI) is not particularly limited, as long as it is a polymer having an ester bond and an imide bond in the molecule, and it is thermosetting. For example, it is also possible to use a product obtained by forming an imide bond from a tricarboxylic acid anhydride and an amine compound, and forming an ester bond from an alcohol and a carboxylic acid or an alkyl ester thereof, and making a free acidic group or anhydride group of the imide bond join in the ester formation reaction. As such a polyesterimide, for example, it is also possible to use a product obtained by reacting a tricarboxylic acid anhydride, a dicarboxylic acid compound or its alkyl ester, an alcohol compound, and a diamine compound, in accordance with a known method.

Examples of the polyesterimide (PEsI) include: trade name: Neoheat8600A, manufactured by Toutoku Toryo Co., Ltd., and the like.

The relative permittivity of the thermosetting resin is preferably 3.0 to 4.5, more preferably 3.0 to 4.0, and further preferably 3.0 to 3.5.

Meanwhile, the relative permittivity can be obtained by providing an electrode on the surface of a wire using a conductive paste, measuring the electrostatic capacity between the conductor and the electrode using a measuring apparatus such as a commercially available LCR meter, and calculating the relative permittivity from the length of the electrode and the thickness of the insulating coated film. Unless particularly stated otherwise, the relative permittivity according to the present invention means a value measured in a constant temperature tank at 100° C. Furthermore, in regard to the frequency, the value may be varied as necessary; however, unless particularly stated otherwise, the relative permittivity according to the present invention means a value measured at 100 Hz.

In the case of a laminated enamel insulating layer, the relative permittivities at 25° C. of the thermosetting resins of the respective enamel insulating layers may be identical or may be different; however, it is preferable that the relative permittivities are different. Particularly, it is more preferable that the relative permittivity of the thermosetting resin on the conductor is higher.

In this way, the electric field at the interface with the conductor is decreased, and an excellent withstand voltage can be obtained without being affected by any damage or foreign materials on the conductor.

Regarding the thermosetting resin, one kind may be used alone, or two or more kinds may be used in combination, in the same enamel insulating layer.

Furthermore, the thermosetting resins used in different enamel insulating layers may be thermosetting resins that are different from each other or may be the same resin, except for a case in which the enamel insulating layers are adjacent to each other.

(Additives)

The adhesion strength between the insulating coated film and the conductor can be enhanced by adding additives such as trialkyl amines, alkoxylated melamine resins, and thiol-series compounds to the thermosetting resin layer, and this is preferable.

Preferable examples of the trialkyl amines include trialkyl amines of lower alkyl groups such as trimethyl amine, triethyl amine, tripropyl amine, tributylamine, and the like.

Among these, trimethyl amine and triethyl amine are preferred in terms of flexibility and adhesion property.

As the alkoxylated melamine resins, for example, the use can be made of melamine resins substituted with a lower alkoxy group, such as butoxylated melamine resins, methoxylated melamine resins, and the like. In the terms of compatibility of the resins, methoxylated melamine resins are preferred.

The thiol-series compound means an organic compound having a mercapto group (—SH). Specific examples thereof include pentaerythritol tetrakis(3-mercaptobutylate), 1,3,5-tris(3-mercaptobutyloxyethyl)-1,3,5-triazine-2,4,6(1H,3H,5H)-trione, butane diol bis(3-mercaptobutylate), butane diol bis(3-mercaptopentylate), 5-amino-1,3,4-thiadiazole-2-thiol, trimethylolpropane tris(3-mercaptobutylate), 5-methyl-1,3,4-thiadiazole-2-thiol, 2,5-dimercapto-1,3,4-thiadiazole, 2-amino-1,3,4-thiadiazole, 1,2,4-triazole-3-thiol, 3-amino-5-mercapt-1,2,4-triazole, and the like.

The content of the above-described additives is not particularly limited. However, the content is preferably 5 parts by mass or less, and more preferably 3 parts by mass or less, with respect to 100 parts by mass of the thermosetting resin.

In the present invention, even if only the contents or types of the additives are different between different enamel insulating layers, those layers are counted as different layers.

There may be one enamel insulating layer, or two or more enamel insulating layers may be laminated. In the present invention, the number of layers for the enamel insulating layer is preferably 1 to 4, more preferably 1 to 3, and further preferably 1 or 2.

(Thickness of Enamel Insulating Layer)

In the present invention, the thickness of the enamel insulating layer is 50 μm or more, preferably 50 to 120 μm, more preferably 60 to 100 μm, and further preferably 70 to 80 μm.

The thickness of the enamel insulating layer is the sum of the enamel insulating layers existing between the conductor and the extruded insulating layer.

Particularly, in the present invention, excellent heat resistance can be obtained by adjusting the thickness of the enamel insulating layer to be 50 μm or more.

In the case of a laminated enamel insulating layer, the thicknesses of the respective enamel insulating layers may be identical with or different from each other. It is preferable that the thicknesses are different, and it is preferable that the thickness becomes larger as the enamel insulating layer is farther from the conductor.

The thickness of the enamel insulating layer closest to the conductor in the laminated enamel insulating layers is preferably 5 to 80 μm, more preferably 5 to 30 μm, and further more preferably 5 to 10 μm. In this manner, an insulating coated film having excellent adhesiveness to the conductor and excellent heat resistance can be obtained.

<Extruded Insulating Layer>

The extruded insulating layer is formed from a thermoplastic resin.

According to the present invention, the extruded insulating layer is such that at least one layer of the extruded insulating layer is provided on at least one layer of the enamel insulating layer. The extruded insulating layer may be a single layer or may have a laminated structure of two or more layers.

(Thermoplastic Resin)

Examples of the thermoplastic resin include: commodity engineering plastics such as polyamide (PA) (nylon), polyacetal (POM), polycarbonate (PC), polyphenylene ether (including a modified polyphenylene ether), polybutylene terephthalate (PBT), polyethylene terephthalate (PET), polyethylene naphthalate (PEN), and ultrahigh molecular weight polyethylene; and in addition, super engineering plastics such as polysulfone (PSF), polyether sulfone (PES), polyphenylene sulfide (PPS), polyarylate (U polymer), polyether ketone (PEK), polyarylether ketone (PAEK), tetrafluoroethylene/ethylene copolymer (ETFE), polyether ether ketone (PEEK) (including a modified polyether ether ketone (modified PEEK)), tetrafluoroethylene/perfluoalkylvinylether copolymer (PFA), polytetrafluoroethylene (PTFE), a thermoplastic polyimide resin (TPI), a thermoplastic polyamideimide (TPAI), and a liquid crystal polyester; and further a polymer alloy composed of polyethylene terephthalate (PET) or polyethylene naphthalate (PEN) as a base resin, ABS/polycarbonate, NYLON 6,6, an aromatic polyamide resin (aromatic PA), polymer alloys containing the foregoing engineering plastics such as polyphenylene ether/NYLON 6,6, polyphenylene ether/polystyrene, and polybutylene terephthalate/polycarbonate.

Thermoplastic resin may be crystalline or non-crystalline.

Further, the thermoplastic resin may be a single resin, or a mixture of two or more kinds of resins.

Among these thermoplastic resins, polyamide (PA), polysulfone (PSF), polyether sulfone (PES), polyphenylene sulfide (PPS), polyether ketone (PEK), polyarylether ketone (PAEK), polyether ether ketone (PEEK) including a modified polyether ether ketone, polytetrafluoroethylene (PTFE), tetrafluoroethylene/perfluoalkylvinylether copolymer (PFA), a thermoplastic polyimide (TPI), and a thermoplastic polyamideimide (TPAI) are preferred; polyether ether ketone (PEEK) including a modified polyether ether ketone, polyphenylene sulfide (PPS), polyamide (PA), polytetrafluoroethylene (PTFE), tetrafluoroethylene/perfluoalkylvinylether copolymer (PFA), a thermoplastic polyimide (TPI), and a thermoplastic polyamideimide (TPAI) are more preferred; polyether ether ketone (PEEK) including a modified polyether ether ketone, polyphenylene sulfide (PPS), and a thermoplastic polyimide (TPI) are further preferred; and polyether ether ketone (PEEK) and polyphenylene sulfide (PPS) are more preferred from the viewpoint of solvent resistance.

The relative permittivity of the thermoplastic resin is preferably 2.0 to 4.0, more preferably 2.0 to 3.5, and further preferably 2.0 to 3.0.

In the case of a laminated extruded insulating layer, the relative permittivities of the thermoplastic resins of the respective extruded insulating layers may be identical or different, and it is preferable that the relative permittivities are different. Furthermore, it is preferable that the relative permittivity of the outermost layer is higher.

In this manner, the electric field of the outermost layer is decreased, and an excellent withstand voltage that is not easily affected by an external damage of the insulating coated film can be obtained.

The extruded insulating layer may be a single layer or may be a laminate of two or more layers. In the present invention, the number of layers of the extruded insulating layer is preferably 1 to 4, more preferably 1 to 3, and further preferably 1 or 2.

(Thickness of Extruded Insulating Layer)

The thickness of the extruded insulating layer may be identical with or different from the thickness of the enamel insulating layer. In the present invention, it is preferable that the thickness of the extruded insulating layer is smaller than or equal to the thickness of the enamel insulating layer, and it is preferable that the thickness of the extruded insulating layer is smaller than the thickness of the enamel insulating layer.

The thickness of the extruded insulating layer is preferably 10 to 200 µm, more preferably 40 to 150 µm, and further preferably 60 to 100 µm.

Meanwhile, the thickness of the extruded insulating layer is the sum total of the extruded insulating layers existing on the enamel insulating layer that exists between the conductor and the extruded insulating layer on the enamel insulating layer.

In the case of a laminated extruded insulating layer, the thicknesses of the respective extruded insulating layers may be identical with or different from each other.

In the present invention, the thickness of each of the extruded insulating layers is preferably 10 µm or more, more preferably 30 µm or more, and further preferably 50 µm or more.

In the present invention, the upper limit of the thickness of each of the extruded insulating layers is preferably 100 µm or less, more preferably 90 µm or less, and further preferably 80 µm or less.

Since the extruded insulating layer is formed by using a thermoplastic resin, the extruded insulating layer is usually formed by extrusion molding.

(Additive)

In the extruded insulating layer, a variety of additives may be incorporated for any purpose.

Examples of these additives include a pigment, a cross-linker, a catalyst, and an antioxidant.

The content of these additives is preferably from 0.01 to 10 parts by mass with respect to 100 parts by mass of the resin which constitutes the extruded insulating layer.

In the outermost layer of the extruded insulating layer which covers a conductor used in the present invention, a self-lubricating resin conventionally prepared by dispersing and mixing a wax and a lubricant may be used.

As a wax, usually used materials may be used without any limitation. Examples thereof include: synthetic waxes such as polyethylene wax, petroleum wax, and a paraffin wax; and natural waxes such as carnauba wax, candelilla wax, and rice wax.

The lubricant may be also used without any limitation. Examples thereof include a silicone, a silicone macromonomer, a fluorine resin, and the like.

<Insulating Coated Film>

(Number of Constituent Insulating Layers)

In the present invention, the insulating coated film is formed from at least one enamel insulating layer and at least one layer of extruded insulating layer. The number of insulating layers that constitute the insulating coated film is preferably 2 to 6, more preferably 2 to 4, further preferably 2 or 3, and particularly preferably 2.

(Thickness and Relative Permittivity)

In the present invention, the thickness of the enamel insulating layer is 50 µm or more.

Further, the total thickness (T) and the relative permittivity ($\varepsilon$) at 100° C. of the laminated insulating coated film; and the maximum thickness (Tmax), and the maximum value ($\varepsilon$max) and the minimum value ($\varepsilon$min) of the relative permittivity at 100° C. of one layer among the laminated insulating layers; satisfy all of the following relations.

$$T \geq 100 \text{ µm} \tag{1.1}$$

$$T\text{max} \leq 100 \text{ µm} \tag{1.2}$$

$$1.5 \leq \varepsilon \leq 3.5 \tag{2.1}$$

$$1.0 \leq \varepsilon\text{max}/\varepsilon\text{min} \leq 1.2 \tag{2.2}$$

Meanwhile, when the total thickness (T) of the laminated insulating coated film is 100 µm, the maximum thickness (Tmax) of one layer among the laminated insulating layers is less than 100 µm. When the maximum thickness (Tmax) of one layer is 100 µm, the total thickness (T) of the laminated insulating coated film is more than 100 µm.

In the present invention, the total thickness (T) of the laminated insulating coated film is 100 µm or more, preferably 110 µm or more, more preferably 130 µm or more, and further preferably 150 µm or more.

The upper limit of the total thickness (T) of the laminated insulating coated film is practically 400 µm or less, preferably 200 µm or less.

When the total thickness (T) of the laminated insulating coated film becomes 100 µm or more, an excellent partial discharge inception voltage and an excellent dielectric breakdown voltage can be obtained.

Among the laminated insulating layers, the maximum thickness (Tmax) of one layer is 100 µm or less, preferably 90 µm or less, more preferably 80 µm or less, and further preferably 70 µm or less.

The lower limit of the maximum thickness (Tmax) of one layer among the laminated insulating layers is practically 5 µm or more, preferably 10 µm or more.

By adjusting the maximum thickness (Tmax) of one layer among laminated insulating layers to be 100 µm or less, an excellent dielectric breakdown voltage can be obtained.

The overall relative permittivity ($\varepsilon$) of the laminated insulating coated film is preferably 1.5 to 3.5, more preferably 1.5 to 3.3, and further preferably 1.5 to 3.0.

When the overall relative permittivity ($\varepsilon$) of the laminated insulating coated film is adjusted to be in the range described above, an excellent partial discharge inception voltage can be obtained.

The ratio ($\varepsilon_{max}/\varepsilon_{min}$) of the maximum value (max) and the minimum value ($\varepsilon_{min}$) of the relative permittivity in the laminated insulating layers is preferably 1.0 to 1.2, more preferably 1.0 to 1.15, and further preferably 1.0 to 1.13.

When the ratio of the relative permittivity is adjusted to be in the range described above, an excellent dielectric breakdown voltage can be obtained.

<<Method of Producing Insulated Wire>>

In the present invention, a thermosetting resin varnish is coated on the outer periphery of the conductor and then baked, to form an enamel insulating layer insulating layer composed of the thermosetting resin. Further, a composition containing a thermoplastic resin is further formed on the enamel insulating layer by an extrusion-molding to form an extruded insulating layer composed of the thermoplastic layer, whereby an insulated wire is produced.

The thermosetting resin varnish contains an organic solvent and the like so as to make the thermosetting resin be a varnish. The organic solvent is not particularly limited as long as the organic solvent does not inhibit the reaction of the thermosetting resin, and examples thereof include amide-based solvents such as N-methyl-2-pyrrolidone (NMP), N,N-dimethylacetamide (DMAC), and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, and cyclohexane; phenol-based solvents such as cresol, phenol, halogenated phenol; sulfone-based solvents such as sulfolane; and dimethylsulfoxide (DMSO).

Of these organic solvents, in view of high solubility, high reaction promotion properties and the like, amide-based solvents, and urea-based solvents are preferred; and in view of a solvent without a hydrogen atom that is apt to inhibit a crosslinking reaction due to heating, N-methyl-2-pyrrolidone (NMP), N,N-dimethylacetamide, N,N-dimethylethyleneurea, N,N-dimethylpropyleneurea, and tetramethylurea are preferred; and N,N-dimethylacetamide, N-methyl-2-pyrrolidone, N,N-dimethylformamide, and dimethylsulfoxide are particularly preferred.

Regarding the organic solvent and the like, one kind may be used alone, or two or more kinds may be used in mixture.

As the thermosetting resin varnish, commercially-available products may be used as mentioned above. In this case, since the thermosetting resin is dissolved in an organic solvent, the varnish contains the organic solvent.

The method of coating the thermosetting resin varnish may be in a usual manner. Examples of the coating method include a method of employing a die for a varnish coating, which has been manufactured so as to be similar to the shape of the conductor, and a method of employing a die that is called "universal die", which has been formed in a curb shape when the cross-section shape of the conductor is quadrangular.

The conductor having the thermosetting resin varnish coated thereon is baked by a baking furnace in a usual manner. Although specific baking conditions depend on the shape of a furnace to be used, in the case where the furnace is an about 8 m-sized vertical furnace by natural convection, the baking can be achieved by setting the passing time period to 10 to 90 sec at the furnace temperature of 400 to 650° C.

In the present invention, an insulated wire can be obtained by using a conductor having an enamel insulating layer formed thereon (also referred to as enamel wire) as a core wire, extrusion-coating the enamel wire with a composition including a thermoplastic resin using a screw of an extruder, and thereby forming an extruded insulating layer on the enamel wire. At this time, the extrusion coating of the thermoplastic resin is carried out using an extrusion die at a temperature higher than or equal to the melting point of the thermoplastic resin (in the case of using a non-crystalline resin, a temperature higher than or equal to the glass transition temperature), so that the external shape of the cross-section of the insulating layer to be extruded has a similar shape or an approximately similar shape to the shape of the conductor, and the external shape becomes a shape with which predetermined thicknesses of sides and corners and predetermined maximum thickness and minimum thickness are obtained. In addition, the extruded insulating layer can also be formed using an organic solvent and the like and the thermoplastic resin.

In a case of using a non-crystalline resin, aside from the extrusion forming, the thermoplastic resin layer can be also formed by coating and baking a varnish of the non-crystalline resin having been dissolved in an organic solvent or the like on an enamel wire, using a die whose shape has the similarity in the shape of the conductor.

As the organic solvent for the thermoplastic resin varnish, organic solvents cited in the above-described thermosetting resin varnish are preferable.

Further, specific baking conditions depend on a shape of the furnace to be used. However, such conditions as described about the thermosetting resin are preferable.

However, in the present invention, from the viewpoint of production suitability in consideration of production cost, it is preferable to perform extrusion molding.

<Characteristics of Insulated Wire>

The insulated wire has a high partial discharge inception voltage (PDIV) and a high dielectric breakdown voltage (BDV).

The higher the partial discharge inception voltage is, the better. The partial discharge inception voltage is preferably 1,000 to 3,000 Vp, more preferably 1,500 to 3,000 Vp, and further preferably 2,000 to 3,000 Vp.

The partial discharge inception voltage can be measured, using a partial discharge tester (for example, "KPD2050" manufactured by Kikusui Electronics Corp). For example, two pieces of insulated wires are brought into close contact with each other with plane contact at the planes of the long sides without any space therebetween over a length of 150 mm, thereby to produce a sample. Measurement can be carried out by applying an alternating-current voltage of 50 Hz sine wave between these two conductors.

The voltage at the time point at which the voltage increase is achieved at a uniform rate of 50 V/second and a partial discharge of 10 pC occurs is the partial discharge inception voltage.

In the present invention, the dielectric breakdown voltage (BDV) is the dielectric breakdown voltage that is measured by the method described in the Examples and is obtainable after notched edgewise bending processing is performed. It is more preferable as this value is higher.

This dielectric breakdown voltage may be 3 kV or higher, more preferably 5 kV or higher, and further preferably 7 kV or higher.

The lower limit of the dielectric breakdown voltage is practically 0.5 kV or lower.

<<Coil, and Electrical or Electronic Equipment>>

The insulated wire of the present invention is applicable to a field which requires electric characteristics (resistance to voltage) and heat resistance, such as various kinds of electrical or electronic equipment including a generator and an electric motor, as coil. For example, the insulated wire of the present invention is used for a motor, a transformer and the like, which can compose high-performance electrical or electronic equipment. In particular, the insulated wire is preferably used as a winding wire for a driving motor of HV (Hybrid Vehicle) or EV (Electric Vehicle). In this way, electrical or electronic equipment, particularly a driving motor of HV or EV, with the use of the insulated wire of the present invention as a coil can be provided. Note that, in the case where the insulated wire of the present invention is used for a motor coil, the insulated wire is also called as the insulated wire for a motor coil. In particular, the coil processed from the insulated wire of the present invention having the above-described excellent properties allows further miniaturization or high-performance of the electrical or electronic equipment. Accordingly, the insulated wire of the present invention is preferably used as a winding wire for a recent driving motor of HV or EV, each of which is remarkable in miniaturization or high-performance.

The coil of the present invention is not particularly limited, as long as it has a form suitable for various kinds of electrical or electronic equipment including a generator and an electric motor, and examples thereof include items formed by a coil processing of the insulated wire of the present invention, and items formed by making an electrical connection of prescribed parts after subjecting the insulated wire of the present invention to a bending processing.

The coils formed by a coil processing of the insulated wire of the present invention are not particularly limited and examples thereof include a roll formed by spirally winding around a long insulated wire. In these coils, the winding wire number or the like of the insulated wire is not particularly limited. Ordinarily, in winding around the insulated wire, an iron core or the like is used.

Example of the items formed by making an electrical connection of prescribed parts after subjecting the insulated wire of the present invention to a bending processing include coils used in a stator for rotating electrical machines or the like. Examples of these coils include a coil 33 (see FIG. 2) prepared by cutting the insulated wire of the present invention in a prescribed length, and then subjecting it to a bending processing in the U-shaped form or the like, thereby preparing a plurality of wire segments 34, and then alternately connecting two open ends (terminals) 34*a* in the U-shaped form or the like of each wire segment 34, as shown in FIG. 3.

Figure 2:
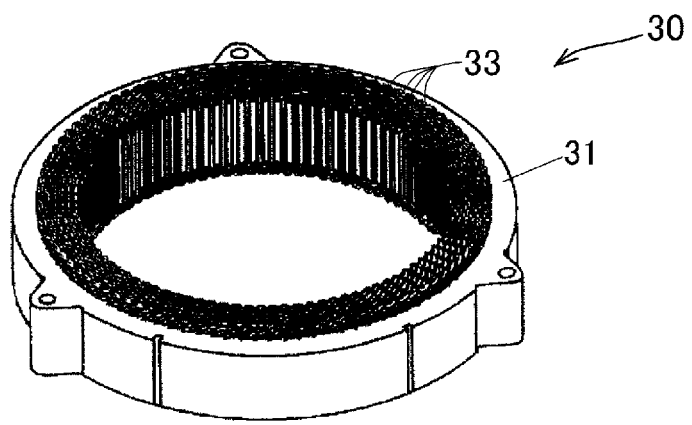
FIG. 2 is a schematic perspective view showing a preferable embodiment of the stator used in the electrical or electronic equipment of the present invention.
Figure 3:
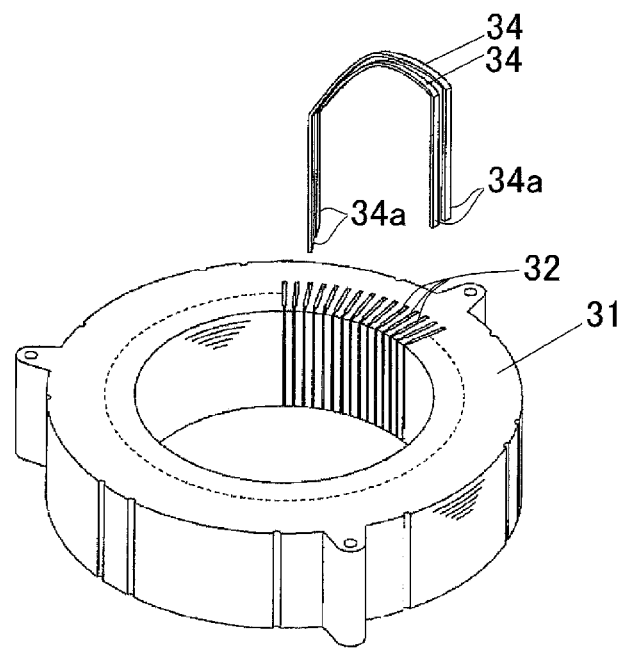
FIG. 3 is a schematic exploded perspective view showing a preferable embodiment of the stator used in the electrical or electronic equipment of the present invention.

The electrical or electronic equipment formed by using this coil is not particularly limited and examples of one preferable embodiment of such electrical or electronic equipment include a rotating electric machine equipped with a stator 30 shown in FIG. 2 (in particular, a driving motor of HV or EV). This rotating electric machine can be made in the same constitution as the conventional one, except for equipment of the stator 30.

The stator 30 can be made in the same constitution as the conventional one, except for its wire segment 34 being formed by the insulated wire of the present invention. Specifically, the stator 30 has a stator core 31, and a coil 33 in which, as shown in such as FIG. 3, wire segments 34 formed of the insulated wire of the present invention are incorporated in a slot 32 of the stator core 31 and open ends 34*a* of the wire segments 34 are electrically connected. Herein, the wire segment 34 may be incorporated in the slot 32 with one segment. However, it is preferable that as shown in FIG. 3, two segments are incorporated in pairs. In this stator 30, the coil 33 formed by alternately connecting the open ends 34*a* that are two ends of the wire segments 34 which have been subjected to a bending processing as described above, is incorporated in the slot 32 of the stator core 31. In this time, the wire segment 34 may be incorporated in the slot 32 after connecting the open ends 34*a* thereof. Alternatively, after incorporating the wire segment 34 in the slot 32, the open ends 34*a* of the wire segment 34 may be subjected to a bending processing, thereby to connect them.

According to the present invention, in a motor coil and an electrical or electronic equipment, it is preferable to use a plurality of types of wires having different shapes or thicknesses in combination.

Specifically, the explanation is as follows.

The portion to be inserted into slots of a stator core is configured such that the coating of the long side is composed of only a thinner line than the short side, and the size in the circumferential direction of the stator core can be reduced without decreasing the efficiency. Furthermore, by inserting only some of the lines that have different thicknesses of the coating between the long side and the short side into the slots, the stator core can be used as a spacer for maintaining the insulation distance at the coil end portion. In this manner, insulating paper can be excluded, and consequently, size reduction of the motor is enabled.

The use of insulated wire of the present invention allows, for example, increase in a ratio (space factor) of the cross-sectional area of the conductor to the slot cross-sectional area of the stator core, whereby properties of the electrical or electronic equipment can be improved.

The insulated wire of the present invention can be used as a coil in the field which requires electric properties (voltage resistance) and heat resistance, such as a rotating machine including a generator and an electric motor, and various kinds of electrical or electronic equipment. For example, the insulated wire of the present invention is used for a motor, a transformer, and the like, by which a high-performance rotating machine and electrical or electronic equipment can be constituted. In particular, the insulated wire is preferably used as a winding wire for a driving motor of the Hybrid Vehicle (HV) or the Electric Vehicle EV.

EXAMPLES

The present invention will be described in more detail based on examples given below, but the invention is not meant to be limited by these.

Hereinafter, the used materials are shown.
<Used Materials>
(1) Thermosetting Resin
  Polyimide (PI)
    PI having relative permittivity of 3.2 [trade name: U-IMIDE, manufactured by Unitika Ltd., varnish]
  Polyamideimide (PAI)
    Low-ε PAI having relative permittivity of 1.8 [trade name: HI406, manufactured by Hitachi Chemical Co., Ltd., varnish]
    To the thermosetting resin, diethylene glycol dimethyl ether (boiling point 162° C.) and triethylene glycol dimethyl ether (boiling point: 216° C.), as foam-forming agents, were added.
    PAI having relative permittivity of 3.9 [trade name: HI406, manufactured by Hitachi Chemical Co., Ltd., varnish]
  Polyetherimide (PEI)
    PEI having relative permittivity of 3.5 [trade name: ultem, manufactured by SABIC]
  The polymers were used in the form of varnish by dissolving each of the polymers in N-methyl-2-pyrrolidone (NMP).
(2) Thermoplastic Resin
  Polyetheretherketone (PEEK)
    PEEK having relative permittivity of 3.1 [trade name: KETASPIRE KT-820, manufactured by Solvay Specialty Polymers]
  Polyphenylene Sulfide (PPS)
    PPS having relative permittivity of 3.3 [trade name: FZ-2100, manufactured by DIC Corporation]
  Tetrafluoroethylene/perfluoalkylvinylether copolymer (PFA)
    PFA having relative permittivity of 2.1 [trade name: NEOFLON, manufactured by DAIKIN INDUSTRIES, LTD]
  Polyamide (PA)
    PA66 having relative permittivity of 12.0 (Polyamide 66) [trade name: LEONA1402S, manufactured by Asahi Kasei Corp.]
  Thermoplastic Polyimide (TPI)
    Thermoplastic PI having relative permittivity of 3.1 [trade name: Aurum PL450C, manufactured by Mitsui Chemicals, Inc.]

Example 1

A rectangular conductor having rectangular cross-section (long side 3.2 mm×short side 1.5 mm, curvature radius of chamfered edge at four corners r=0.3 mm) (copper having an oxygen content of 15 ppm) was used.

A polyimide (PI) varnish [trade name: U-IMIDE, manufactured by Unitika Ltd., relative permittivity: 3.2] was applied on the surface of the conductor 11 using a die having a cross-sectional shape similar to that of the conductor, and the wire was passed through the interior of a natural convection type firing furnace having a furnace length of 5 m and having the temperature inside the furnace set to 300° C. to 500° C. at a speed that provided a passage time of 5 to 10 seconds. This operation was repeated several times to form an enamel insulating layer formed from a thermosetting resin having a thickness of 60 µm, and thus an enamel wire was obtained.

With the obtained enamel wire as a core wire, an extruded insulating layer composed of a thermoplastic resin was formed on the outer side of the core wire using an extruder equipped with a 30 mm full flight screw (screw L/D=25, screw compression ratio=3). Here, PEEK [trade name: KETASPIRE KT-820, manufactured by Solvay Specialty Polymers LLC, relative permittivity: 3.1] was used as the thermoplastic resin, and extrusion coating of the thermoplastic resin to a thickness of 90 µm was performed at 370° C. (temperature of the extrusion die) using an extrusion die having a cross-sectional shape similar to the shape of the conductor.

In this way, an insulated wire composed of one enamel insulating layer and one extruded insulating layer provided on the conductor was produced.

Examples 2 and 3

Insulated wires composed of one enamel insulating layer and one extruded insulating layer on the conductor were produced in the same manner as in Example 1, except that the resin having the relative permittivity as described in the Table 1 was used, and the thicknesses of the enamel insulating layer and the extruded insulating layer were changed as shown in the Table 1.

Example 4

A polyimide (PI) varnish [trade name: U-IMIDE, manufactured by Unitika Ltd., relative permittivity: 3.2] was applied on the surface of the same conductor 11 as in Example 1 using a die having a cross-sectional shape similar to that of the conductor, and the wire was passed through the interior of a natural convection type firing furnace having a furnace length of 5 m and having the temperature inside the furnace set to 300° C. to 500° C. at a speed that provided a passage time of 5 to 10 seconds. This operation was repeated several times to form a first enamel insulating layer formed from a thermosetting resin having a thickness of 75 µm.

A PEI varnish obtained by dissolving a polyetherimide PEI [trade name: ULTEM, manufactured by SABIC, relative permittivity: 3.5] in N-methyl-2-pyrrolidone (NMP) was applied on the surface of the first enamel insulating layer using a die having a cross-sectional shape similar to that of the conductor, and the wire was passed through the interior of a natural convection type firing furnace having a furnace length of 5 m and having the temperature inside the furnace set to 300° C. to 500° C. at a speed that provided a passage time of 5 to 10 seconds. This operation was repeated several times to form a second enamel insulating layer formed from a thermosetting resin having a thickness of 5 µm, and thus an enamel wire was obtained.

The enamel wire thus obtained was used as a core wire, and an extruded insulating layer was formed in the same manner as in Example 1, except that the thermoplastic resin and the thickness were changed to the thermoplastic resin having the relative permittivity and the thickness as described in the Table 1.

In this way, an insulated wire composed of two enamel insulating layers and one extruded insulating layer provided on the conductor was produced.

Example 5

An insulated wire composed of two enamel insulating layers and one extruded insulating layer on the conductor was produced in the same manner as in Example 4, except that the resin having the relative permittivity as described in the Table 1 was used, and the thicknesses of the first and second enamel insulating layers and the extruded insulating layer were changed as shown in the Table 1.

Example 6

An insulated wire composed of three enamel insulating layers and one extruded insulating layer on the conductor was produced in the same manner as in Example 4, except that the resin having the relative permittivity as described in the Table 1 was used to provide a third enamel insulating layer in the same manner as in the case of the first enamel insulating layer in Example 4, and the thicknesses of the first to third enamel insulating layers and the extruded insulating layer were changed as shown in the Table 1.

Example 7

An insulated wire composed of two enamel insulating layers and two extruded insulating layers on the conductor was produced in the same manner as in Example 4, except that the resin having the relative permittivity as described in the Table 1 was used to provide a second extruded insulating layer in the same manner as in the case of the first extruded insulating layer in Example 4, and the thicknesses of the first and second enamel insulating layers and the first and second extruded insulating layers were changed as shown in the Table 1.

Comparative Example 1

A polyamideimide (PAI) varnish [trade name: HI-406, manufactured by Hitachi Chemical Co., Ltd., relative permittivity: 3.9] was applied on the surface of the same conductor 11 as in Example 1 using a die having a cross-sectional shape similar to that of the conductor, and the wire was passed through the interior of a natural convection type firing furnace having a furnace length of 5 m and having the temperature inside the furnace set to 300° C. to 500° C. at a speed that provided a passage time of 5 to 10 seconds. This operation was repeated several times to form a first enamel insulating layer formed from a thermosetting resin having a thickness of 50 μm. In this way, an insulated wire composed of one enamel insulating layer provided on the conductor was produced.

Comparative Examples 2 and 3

Insulated wires composed of one enamel insulating layer and one extruded insulating layer on the conductor were produced in the same manner as in Example 1, except that the resin having the relative permittivity as described in the Table 1 was used, and the thicknesses of the enamel insulating layer and the extruded insulating layer were changed as shown in the Table 1.

<Measurement and Evaluation>

For each of the insulated wires thus obtained, the voltage resistance, partial discharge inception voltage (PDIV), heat resistance, and notched edgewise bending withstand pressure were evaluated.

The relative permittivities of the resins used were measured as follows.

[Relative Permittivity at 100° C. of Insulating Coated Film]

The relative permittivity of the insulating coated film was determined by measuring the electrostatic capacity of the insulated wire, and calculating the relative permittivity from the electrostatic capacity and the outer diameters of the conductor and the insulated wire, based on the relation represented by the following equations. For the measurement of the electrostatic capacity, an LCR HiTESTER [manufactured by HIOKI E.E. CORPORATION, Model 3532-50] was used, and the measurement was made in a constant temperature tank at 100° C. The measurement frequency was 100 Hz.

$$Cp=Cf+Ce \tag{3.1}$$

$$Cf=(\varepsilon/\varepsilon_0)\times 2\times (L_1+L_2)/T \tag{3.2}$$

$$Ce=(\varepsilon/\varepsilon_0)\times 2\pi\varepsilon_0/\mathrm{Log}\{(r+T)/r\} \tag{3.3}$$

Here, Cp is the electrostatic capacity per unit length [pF/m] of the insulating coated film, and this is a composition of the electrostatic capacity of flat portions, Cf, and the electrostatic capacity of corner portions, Ce.

$L_1$ and $L_2$ are the lengths of the long side and the short side, respectively, of the straight portions of the conductor; r is the radius of curvature of the conductor corners; and T is the thickness of the insulating coated film.

[Evaluation of Dielectric Strength]

Regarding the dielectric breakdown voltage, an electrode was provided by winding an aluminum foil having a width of about 10 mm around a linearly shaped insulated wire, an alternating current voltage having a 50-Hz sinusoidal waveform was applied between the conductor and the electrode at a rate of voltage increase of 500 V/second, and the effective voltage value obtained when a current of 5 mA or more flowed was designated as the dielectric breakdown voltage. This was performed five times, and the average value was calculated. The value obtained by dividing (÷) the average value by the thickness of the insulating coated film was designated as the dielectric strength, and the dielectric strength was evaluated according to the following evaluation criteria.

Evaluation Criterion

⊚: 150 V/μm or more
○: 120 V/μm or more and less than 150 Vμm
Δ: 100 V/μm or more and less than 120 Vμm
×: less than 100 Vμm

[Evaluation of Partial Discharge Inception Voltage (PDIV)]

A partial discharge inception voltage was measured, using a partial discharge tester "KPD2050" (trade name), manufactured by Kikusui Electronics Corp. Two pieces of the respective insulated wire were brought into close contact with each other with plane contact at the planes of the long sides without any space therebetween over a length of 150 mm, thereby to produce a sample. Measurement was carried out by applying an alternating-current voltage of 50 Hz sine wave between these two conductors. Elevation of voltage was controlled at a constant speed in a rate of 50V/sec, and the voltage at the time when 10 pC of partial discharge occurred was read. A measuring temperature was set to 100° C. Then, the insulated wire was put into a thermostat bath having been set to the predetermined temperature, and at the time when the temperature became constant, measurement was carried out.

The results thus obtained were evaluated according to the following evaluation criteria.

Evaluation Criterion

⊚: 1,800 Vp or more
○: 1,500 Vp or more and less than 1,800 Vp

Δ: 1,000 Vp or more and less than 1,500 Vp
×: less than 1,000 Vp
[Evaluation of Thermal Resistance]

Thermal resistance of the insulated wire was evaluated as follows.

A wound specimen was put into a high-temperature bath having been set to 190° C. in accordance with JIS C 3003, Methods of test for enamel wires, Section 7, Flexibility. Existence or non-existence of cracks in the enamel insulating layer or the extruded insulating resin layer after still standing for 1000 hours was checked visually. The results thus obtained were evaluated according to the following evaluation criteria.

Evaluation Criterion
⊙: Non-existence of cracks
×: Existence of cracks

[Notched Edgewise Bending Withstand Pressure]

Notched edgewise bending processing was performed as described below, and measurement of the dielectric breakdown voltage (BDV) of the insulated wire was carried out.

(Notched Edgewise Bending Processing)

The notched edgewise bending processing was conducted in accordance with "coiling test" specified in JIS C 3216-3: 2011.

The "coiling test" described above is also referred to as notched edgewise bending test, and refers to a bending method of bending one of edge planes of an insulated wire as an inner diameter plane. This is also referred to as a bending method of bending an insulated wire in the width direction. Here, "edge plane" means a plane in which short sides in a longitudinal cross section of a rectangular insulated wire are continuously formed in the axial direction, and "flat plane" means a plane in which long sides in a longitudinal cross section of a rectangular insulated wire are continuously formed in the axial direction.

The notched edgewise bending test is a test for evaluating the effect of preventing the generation of cracks that reach to the conductor, the cracks being caused by the mechanical stress acting at the time of coil processing of the insulated wire and remaining after the processing.

(Measurement of Dielectric Breakdown Voltage (BDV))

The dielectric breakdown voltage of the insulated wire was evaluated by measuring the voltage of a sample obtained after the notched edgewise bending test, using a dielectric breakdown testing machine.

Specifically, an earth electrode was connected to a portion of the insulated wire, from which the terminal on one side had been detached, the portion that had been subjected to the edgewise bending test was embedded in copper grains, and a high-voltage side electrode was connected to these copper grains. The voltage was increased at a rate of voltage increase of 500 V/second, and the voltage obtained when a current of 5 mA or more flowed was read out. This operation was carried out five times, and the dielectric breakdown voltage was evaluated from the average value. Thus, the dielectric breakdown voltage was evaluated according to the following evaluation criteria.

Evaluation Criterion
⊙: 7 kV or more
○: 5 kV or more and less than 7 kV
Δ: 3 kV or more and less than 5 kV
×: less than 3 kV The obtained results are shown together in Table 1.

Herein, the expression "-" indicates that the material was not in use, or that the value was 0 (zero), or that since the evaluand layer was non-existent, it was not evaluated.

TABLE 1

| | | Ex 1 | Ex 2 | Ex 3 | Ex 4 | Ex 5 |
|---|---|---|---|---|---|---|
| Insulating layer 1 | Kind of insulating layer | Enamel | Enamel | Enamel | Enamel | Enamel |
| | Resin | PI | PI | Low-ε PAI | PI | PEI |
| | Thickness (t1) [μm] | 80 | 60 | 70 | 75 | 10 |
| | Relative permittivity (ε1) | 3.1 | 3.2 | 1.8 | 3.2 | 3.5 |
| Insulating layer 2 | Kind of insulating layer | Extrusion | Extrusion | Extrusion | Enamel | Enamel |
| | Resin | PEEK | PPS | PFA | PEI | PI |
| | Thickness (t2) [μm] | 60 | 90 | 30 | 5 | 90 |
| | Relative permittivity (ε2) | 3.2 | 3.3 | 2.1 | 3.5 | 3.2 |
| Insulating layer 3 | Kind of insulating layer | — | — | — | Extrusion | Extrusion |
| | Resin | — | — | — | PEEK | PEEK |
| | Thickness (t3) [μm] | — | — | — | 80 | 65 |
| | Relative permittivity (ε3) | — | — | — | 3.1 | 3.1 |
| Insulating layer 4 | Kind of insulating layer | — | — | — | — | — |
| | Resin | — | — | — | — | — |
| | Thickness (t4) [μm] | — | — | — | — | — |
| | Relative permittivity (ε4) | — | — | — | — | — |
| Thickness of insulating coated film | T [μm] | 140 | 150 | 100 | 160 | 165 |
| Maximum thickness of insulating layers 1 to 4 | Tmax [μm] | 80 | 90 | 70 | 80 | 90 |
| Relative permittivity of insulating coated film | E | 3.2 | 3.3 | 1.9 | 3.2 | 3.2 |
| Ratio of relative permittivity | εmax/εmin | 1.03 | 1.03 | 1.17 | 1.13 | 1.13 |
| Thickness of enamel insulating layer | Tenamel [μm] | 80 | 60 | 70 | 80 | 100 |
| The number of laminated layers | | 2 | 2 | 2 | 3 | 3 |
| Evaluation item | Dielectric strength | ⊚ | ○ | ⊚ | ⊚ | ○ |
| | PDIV | ○ | ○ | ⊚ | ⊚ | ⊚ |
| | Thermal resistance | ⊚ | ⊚ | ⊚ | ⊚ | ⊚ |
| | Notched edgewise bending withstand pressure | ⊚ | ○ | ○ | ⊚ | ⊚ |

Remarks: 'Ex' means Example according to this invention.

| | | Ex 6 | Ex 7 | CEx 1 | CEx 2 | CEx 3 |
|---|---|---|---|---|---|---|
| Insulating layer 1 | Kind of insulating layer | Enamel | Enamel | Enamel | Enamel | Enamel |
| | Resin | PEI | PI | PAI | PI | PI |
| | Thickness (t1) [μm] | 5 | 90 | 50 | 50 | 20 |
| | Relative permittivity (ε1) | 3.5 | 3.2 | 3.9 | 3.2 | 3.2 |

TABLE 1-continued

| | | | | | | |
|---|---|---|---|---|---|---|
| Insulating layer 2 | Kind of insulating layer | Enamel | Enamel | — | Extrusion | Extrusion |
| | Resin | PAI | PEI | — | PA66 | PPS |
| | Thickness (t2) [μm] | 70 | 10 | — | 50 | 180 |
| | Relative permittivity (ε2) | 3.9 | 3.5 | — | 12.0 | 3.3 |
| Insulating layer 3 | Kind of insulating layer | Enamel | Extrusion | — | — | — |
| | Resin | PEI | TPI | — | — | — |
| | Thickness (t3) [μm] | 5 | 50 | — | — | — |
| | Relative permittivity (ε3) | 3.5 | 3.1 | — | — | — |
| Insulating layer 4 | Kind of insulating layer | Extrusion | Extrusion | — | — | — |
| | Resin | PPS | PEEK | — | — | — |
| | Thickness (t4) [μm] | 100 | 50 | — | — | — |
| | Relative permittivity (ε4) | 3.3 | 3.1 | — | — | — |
| Thickness of insulating coated film | T [μm] | 180 | 200 | 50 | 100 | 200 |
| Maximum thickness of insulating layers 1 to 4 | Tmax [μm] | 100 | 90 | 50 | 50 | 180 |
| Relative permittivity of insulating coated film | ε | 3.5 | 3.2 | 3.9 | 5.1 | 3.3 |
| Ratio of relative permittivity | εmax/εmin | 1.18 | 1.13 | 1.00 | 3.75 | 1.03 |
| Thickness of enamel insulating layer | Tenamel [μm] | 80 | 100 | 50 | 50 | 20 |
| The number of laminated layers | | 4 | 4 | 1 | 2 | 2 |
| Evaluation item | Dielectric strength | ○ | ○ | ◉ | x | Δ |
| | PDIV | ◉ | ◉ | x | Δ | ◉ |
| | Thermal resistance | ◉ | ◉ | ◉ | x | ◉ |
| | Notched edgewise bending withstand pressure | ◉ | ◉ | x | ○ | Δ |

Remarks: 'Ex' means Example according to this invention, and 'CEx' means Comparative Example.

From Table 1 given above, it can be seen that the insulated wires of the present invention of Examples 1 to 7 had excellent dielectric strength and heat resistance, high partial discharge inception voltage (PDIV), and superior notched edgewise bending withstand pressure, by adopting the configuration of the present invention, compared to the insulated wires of Comparative Examples 1 to 3.

In contrast, the insulated wire of Comparative Example 1 having only enamel insulating layers had low partial discharge inception voltage (PDIV) and inferior notched edgewise bending withstand pressure. This is speculated to be because, even though the relative permittivity of the insulating coated film was 3.5, the total thickness (T) of the insulating coated film was thin, such as less than 100 μm. Furthermore, it is speculated that since the insulating coated film was composed of a plurality of insulating layers, cracks did not reach to the conductor.

Both of the insulated wire of Comparative Examples 2 and 3, each having an enamel insulating layer and an extruded insulating layer, exhibited inferior dielectric strength.

In addition to this, the insulated wire of Comparative Example 2 had a low partial discharge inception voltage (PDIV) and inferior heat resistance. The insulated wire of Comparative Example 3 had an inferior notched edgewise bending withstand pressure.

In the insulated wire of Comparative Example 2, the overall relative permittivity (ε) of the insulating coated film was high, and the ratio of relative permittivities (εmax/εmin) was also high.

Regarding the insulated wire of Comparative Example 3, the thickness of the extruded insulating layer was 180 μm, and this was significantly greater than the maximum thickness (Tmax) of one layer of insulating layer, which is 100 μm or less.

It is speculated that the results of Comparative Example 3 are based on the fact that as the maximum thickness (Tmax) of one layer of insulating layer exceeds 100 μm, the dielectric breakdown voltage per unit thickness becomes inferior, and thereby the heat resistance of the insulating material of the insulating layer is lower.

From the results described above, it can be seen that since the insulated wire of the present invention has excellent electrical characteristics, mechanical characteristics, and durability, the insulated wire can be suitably used as a coil for various electrical or electronic equipments, including rotating machines such as a generator and a motor, particularly for a motor and a transducer, and as a wound wire for driving motors of hybrid cars (HV) or electric cars (EV).

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Insulated wire
11 Conductor
21 Insulating coated film
21a Enamel insulating layer
21b Extruded insulating layer
30 Stator
31 Stator core
32 Slot
33 Coil
34 Wire segment

The invention claimed is:

1. An insulated wire, comprising:
   a conductor having a rectangular cross-section; and
   an insulating coated film having at least two insulating layers laminated together on the conductor, thereby forming a laminated insulating coated film,
   wherein the at least two insulating layers comprise:
      an enamel insulating layer formed from a thermosetting resin on an outer periphery of the conductor, and
      an extruded insulating layer formed from a thermoplastic resin on an outer side of the enamel insulating layer,
   wherein a thickness of the enamel insulating layer is 50 μm or more, and
   wherein a total thickness (T) and a relative permittivity (ε) at 100° C. of the laminated insulating coated film; and a maximum thickness (Tmax), and a maximum value (εmax)

and a minimum value (εmin) of a relative permittivity at 100° C. of one layer among the at least two insulating layers; satisfy all of the following relations:

$$T \geq 100 \text{ μm} \quad (1.1)$$

$$T\max \leq 100 \text{ μm} \quad (1.2)$$

$$1.5 \leq \varepsilon \leq 3.5 \quad (2.1)$$

$$1.0 \leq \varepsilon\max/\varepsilon\min \leq 1.2 \quad (2.2)$$

2. The insulated wire according to claim 1, wherein the thermosetting resin is at least one kind of thermosetting resin selected from the group consisting of a polyamideimide resin, a polyimide resin and a polyetherimide resin.

3. The insulated wire according to claim 1, wherein the thermoplastic resin is at least one kind of thermoplastic resin selected from the group consisting of polyether ether ketone, a thermoplastic polyimide and polyphenylene sulfide.

4. The insulated wire according to claim 1, wherein the number of insulating layers laminated together on the conductor is 4 or less.

5. A coil, comprising the insulated wire according to claim 1.

6. An electrical or electronic equipment, comprising the coil according to claim 5.

7. The electrical or electronic equipment according to claim 6, wherein the electrical or electronic equipment is a generator or an electric motor.

8. The insulated wire according to claim 1, wherein the thickness of the enamel insulating layer is 70 μm or more.

* * * * *